July 1, 1969   R. C. WEBSTER ET AL   3,453,121
METHOD OF CHILLING FRESH FRUIT PRODUCTS IN BULK
Filed July 7, 1964
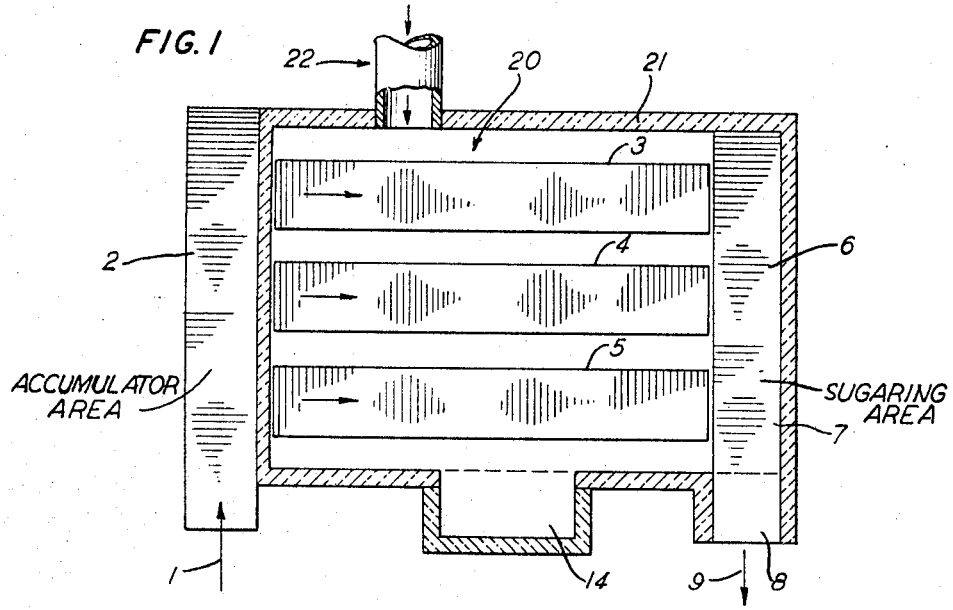
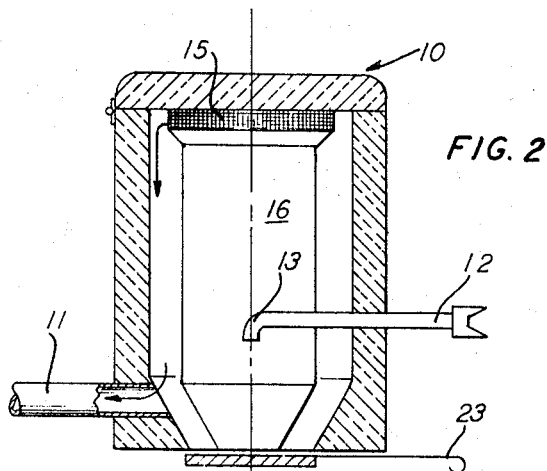
INVENTORS
JOHN S. HINN
ROBERT C. WEBSTER
BY Jonathan Plaut
ATTORNEY 3,453,121
METHOD OF CHILLING FRESH FRUIT PRODUCTS IN BULK
Robert C. Webster, Madison, Wis., and John S. Hinn, Minneapolis, Minn., assignors to Air Reduction Company, Incorporated, New York, N.Y., a corporation of New York
Filed July 7, 1964, Ser. No. 380,900
Int. Cl. A23b 1/06
U.S. Cl. 99—193                    14 Claims

ABSTRACT OF THE DISCLOSURE

This invention relates to a process for cooling articles of food in bulk in which the food is initially precooled and then intermixed with granules of sugar which have previously been reduced to a cryogenic temperature.

---

This invention relates to the preservation of bulk quantities of articles of food.

More particularly, this invention relates to the cooling of quantities of fruits and vegetables in bulk containers, said cooling including the addition to said containers of sugar granules at cryogenic temperatures.

In the preservation of food, the bulk cooling of quantities of articles of food, that is, fruits and vegetables, or other perishable food items, has posed a problem. The most commonly used technique to cool articles of food in the bulk container is the "blast tunnel" technique, in which articles of food in containers are placed in a chamber and subjected to either still cold vapors or moving cold vapors for an extended period of time until the articles cool sufficiently, usually to temperatures of 35° F. to 50° F. Said method of cooling food is unsatisfactory for a number of reasons, included in which is the fact that the long period of time for cooling the center of the container of food is uneconomical and the fact that there is a loss of texture, color, and flavor, due to the slow process.

It has been proposed to freeze articles of food such as fruits and vegetables by immersing said articles in a cryogenic liquid, by spraying said articles with a cryogenic liquid, or by subjecting said articles to the effluent evolving from a cryogenic liquid. Said method of food freezing has been acceptable in some areas, especially where individual units of food, or relatively small packages of food, are to be frozen. However, said method is most easily adapted to food preservation where the articles of food are in small quantities and are to be frozen, not just cooled.

It is most desirable in the preservation of articles of food to employ an economical method wherein the articles, in bulk quantities, are brought to a cooler temperature, but not frozen. For such food cooling, neither the "blast tunnel" technique nor the immersion, spray or contact with effluent of a cryogenic liquid methods of freezing have proved satisfactory.

It is an object of this invention to provide a novel method of preserving articles of food in bulk.

It is further an object of this invention to provide an economical method of cooling articles of food, including the efficient addition of a cryogenic temperature medium to the containers carrying said articles.

It is further an object of this invention to rapidly cool bulk quantities of fruits and vegetables in bulk containers without the necessity of employing the blast tunnel technique of cooling, which is slow, or flash freezing of the article by immersion freezing techniques.

It is further an object of this invention to provide apparatus for rapid cooling of food, which apparatus is both efficient and economical.

Further objects and advantages of this invention will become apparent in connection with the following detailed description of the invention.

The term "cryogenic liquid" as used in this disclosure refers to liquids of a temperature below −100° F. Likewise, "cryogenic temperature" refers to temperatures below −100° F.

Throughout this disclosure, liquid nitrogen or nitrogen effluent (cold nitrogen vapor) is used as one example of a cryogenic liquid or effluent that may be employed in carrying out this invention. However, this disclosure is not limited to the use of nitrogen liquid or effluent, but rather, other cryogenic liquids or effluents as found desirable may be employed.

In general, according to this invention, large bulk containers, for example, 440-pound bulk containers or drums, are filled with quantities of articles of food, often fruits or vegetables such as strawberries. Normally, the temperature of the food at the time it is placed into the bulk containers is in the range of 55 to 80° F. The bulk containers are then removed into a cold insulated room where circulating cold effluent from a cryogenic liquid, such as liquid nitrogen, cool the outer layer of articles next to the container wall. The effect of heat transfer will cause the articles of food toward the center of the container to cool, as heat flows from the warmer articles toward the center of the container to the cooled articles near the container wall.

The bulk containers then move to an exit point in the insulated cold room. At this point granulated sugar is added to each of the bulk containers, according to the desired ratio of sugar to food quantity for desired taste (usually within the range of one to three to one to six, weight sugar to weight of articles of food—the ratio is approximately one to four for strawberries). The granular sugar has been previously frozen to −300° F. or any other desired level in the cryogenic range. The frozen granular sugar is added to the bulk containers to provide a source for the desired additional degree of refrigeration needed to cool the articles of food to the desired level. The bulk container may be agitated to insure mixing of the sugar with the food articles. If the desired temperature for the articles of food has not yet been achieved, cryogenic liquid or effluent of cryogenic liquid may be sprayed into the chamber containing the containers to further lower the temperature.

The extremely rapid cooling of the bulk quantities of the articles of food, by the method generally described above, reduces that loss of texture, color, and, most important, flavor, that occurs in previously described slow "blast tunnel" bulk cooling.

The sugar granules split apart upon being lowered to a temperature in the cryogenic range. This physical phenomenon is apparently due to the shock that the individual granules undergo upon being lowered rapidly to temperatures in the cryogenic range. The fracture of the sugar granule to ⅓ of its original size as a result of the lowering of the temperature increases the surface area of the sugar cooling media, and results in an increased cooling effect on the food. The mixing of the sugar is uniform and virtually instantaneous and an agglomeration of the cold, small, dry particles is thus avoided. The addition of the sugar to a 440-pound barrel of strawberries allows for cooling of the strawberries from 65° F. to 50° F. in about four hours, as compared to approximately twenty-four hours of cooling necessary with standard commercial refrigeration units.

The added granular sugar thus contributes to rapid cooling as well as an even and rapid distribution of said cooling effect. Furthermore, the sugar is added in the preserving of the food article anyway, for sweetening, and thus a media for introducing refrigeration effect to the food articles which is highly efficient and economical is utilized.

The invention will now be described in more detail with regard to the following drawings.

FIGURE 1 shows a general plan illustrative of the cooling procedure of food according to this invention; and FIGURE 2 shows one type of sugar adding device, which may be employed, for example, in the general plan shown in FIGURE 1.

In FIGURE 1 bulk containers loaded with articles of food are introduced at 1 from a filling station into an accumulator area 2. They pass from the accumulator area 2 into the chamber 20, in which are located a series of moving belts or conveyors 3, 4, and 5, which may be constructed and empowered in any desired manner. The containers may be moved by hand through the area shown as containing the belts. The chamber is insulated in any desired manner, such as with cork, as shown, for example, at 21. Effluent of a cryogenic liquid, for example, cold nitrogen vapor, is introduced into the chamber 20 through duct structure, diagrammatically shown at 22, in order to create an environment which will cool the food articles in the containers located within the chamber.

The outer layer of food articles next to the container wall cools as a result of heat exchange through the container walls with the effluent environment, heat flowing from the warmer food articles toward the cooler environment of cold effluent. The time that the food articles spend on the belts, that is in the effluent environment, varies according to the particular food articles involved. In the case of fresh strawberries, the bulk containers may remain in the cooling area, on the belts 3, 4, and 5, for a period of approximately 30 minutes before sugaring.

In the time prescribed, the bulk containers reach the sugaring area 6 where they are transferred onto another rolling conveyor 7, in the illustrative plan shown in FIGURE 1. Again, the system of conveyors described is merely illustrative of a desired method of moving the containers. Other methods may be used, including manual movement. While located in the sugaring area 6, the containers move beneath a sugaring device, generally shown at 10 in FIGURE 2. At this point a prescribed amount of sugar, according to the articles of food involved, which sugar is cooled to a particular cryogenic temperature, is dropped into each bulk container. In the case of the strawberries, 110 pounds of sugar cooled to approximately −300° F. is dropped into each 440-pound container.

Immediately following sugaring, the container may be passed to a shaking platform 8 and agitated for a short period of time, 30 seconds, for example, to distribute the cold sugar throughout the container. The shaking of the container is an optional feature, with the choice of whether or not to shake the container dependent on the nature of the food articles therein—susceptibility to damage as a result of agitation being a factor to consider. When the container emerges at 9 to the palletizing area, closure thereof is effected.

The effluent gas supplied to chamber 20 may be at least partially supplied from the sugar cooling device 10 shown in FIGURE 2, shown as supplied through duct 11, after vaporizing as a result of heat transfer during the cooling of the sugar to be added to the containers, such cooling of the sugar to be now described. Cryogenic liquid, liquid nitrogen, for example, is conducted through line 12, terminating in a spray head 13 which injects the liquid into the sugar cooling device to bring sugar contained in compartment 16 to the required cryogenic temperature. The screen 15 in the sugaring device of FIGURE 2 allows the vaporized liquid effluent to escape from the sugar cooling area 16, in order to avoid the buildup of pressure within said area 16 where the sugar is prepared. The escaping gas surrounds the cooling area 16, as shown in FIGURE 2, further cooling the sugar containing area 16 before passing into the cold chamber 20, as effluent. The dry sugar granules in area 16 of sugar cooling device 10 having been cooled by heat exchange with cryogenic liquid and effluent to a cryogenic temperature, are transferred to the container of food (one container being shown in position in FIGURE 2) by movement of gate 23.

The rate of flow of effluent nitrogen leading into the cooling room can be controlled by the use of ordinary valves, and a blower (not shown) inset in area 14 of chamber 20 may be used to circulate the efflux nitrogen. This blower will pick up colder, denser nitrogen from the floor and direct it in a line along the ceiling, thus serving to increase efficiency by increasing the period of contact between the cold gas and the bulk container, thereby absorbing more heat per unit weight of gas.

By determining the flow rate through the liquid nitrogen intake line connecting to line 12, at a given pressure, the amount of time necessary to introduce a proper amount of cryogenic liquid, nitrogen, into the area 16 in order to reduce the sugar in said area to the desired cryogenic temperature can be determined. An air operated valve actuated by an electric timer (not shown) may be used to assure the introduction of the proper amount of liquid nitrogen to cool the sugar from the known beginning temperature to approximately −300° F., or other desired cryogenic temperatures.

The following figures show the calculated refrigeration effect in B.t.u.'s of refrigeration required to cool 440 pounds of strawberries from certain beginning temperatures to certain final equilibrium temperatures. For example, 6,100 B.t.u.'s would have to be removed from the 440-pound lot in order to cool the berries from 65° F. to 50° F. It would require 10,000 B.t.u.'s of refrigeration to cool this quantity of strawberries from a beginning temperature of 65° F. to 40° F.

TABLE I.—REFRIGERATION EFFECT REQUIRED TO COOL 440 POUNDS OF STRAWBERRIES

[Expressed in B.t.u.]

| Beginning temperature ° F. | End equilibrium temperature | | | | |
|---|---|---|---|---|---|
| | 50° F. | 45° F. | 40° F. | 35° F. | 30° F. |
| 65 | 6,065 | 8,100 | 10,100 | 12,100 | 14,100 |
| 60 | 4,100 | 6,100 | 8,100 | 10,100 | 12,100 |
| 55 | 2,100 | 4,100 | 6,100 | 8,100 | 10,100 |
| 50 | 0 | 2,100 | 4,100 | 6,100 | 8,100 |

Assumption: Specific heat of strawberries=0.92 B.t.u./lb./° F.

Granular sugar has an average specific heat at ordinary temperatures of about 0.15/lb./° F. In other words, 0.15 B.t.u. of heat is required to raise the temperature of one pound of sugar one degree Fahrenheit. If this sugar were cooled to −300° F., then the 110 pounds of sugar used in each drum, brought to 40° F. ($\Delta t$ 340° F.), would absorb:

$$340 \times 0.15 \times 110 = 5,610 \text{ B.t.u.}$$

Thus, the refrigeration effect from the use of subcooled sugaring would be almost enough to reduce the temperature of the entire drum of berries from 65° F. to 50° F., and more than enough to reduce the temperature of the entire drum of berries from 60° F. to 50° F.

Table II shows the available refrigeration effect from 110 pounds of granular sugar cooled to −300° F. and brought to a higher temperature as a result of heat exchange with a warmer media (food) which is cooling.

TABLE II.—AVAILABLE REFRIGERATION EFFECT FROM 110 POUNDS OF GRANULAR SUGAR COOLED TO −300° F.

[Heat energy in B.t.u.'s absorbed to equilibrate at various temperatures]

| End temperature, ° F.: | B.t.u.'s absorbed per pound |
|---|---|
| +50 | 5,760 |
| 45 | 5,680 |
| 40 | 5,610 |

| | |
|---|---|
| 35 | 5,520 |
| 30 | 5,440 |

Assuming average specific heat of granular sugar=0.15 B.t.u./lb./° F.

This table, in association with Table I, shows that the cooling effect of the sugar alone is not sufficient to cool the 440-pound lot of strawberries from a beginning temperature of 65° F. to a desired temperature of 40° F., for example.

The refrigeration of the articles of food, in addition to the refrigeration supplied by the sugar granules cooled to cryogenic temperatures can be acquired effectively, for example, from either or both of two commonly used sources. If an immersion freezing operation is proceeding concurrently with the bulk container cooling operation, effluent of cryogenic liquid (nitrogen) at cryogenic temperature will be available for supply to the cooling chamber 20. Furthermore, as previously discussed, effluent nitrogen can be supplied efficiently to the cold chamber 20 from the sugar cooling device 10 of FIGURE 2. If the desired end temperature of the food to be cooled is to be, say, 35° F., still additional refrigeration will be required besides the cold granular sugar and the effluent nitrogen. This refrigeration may be provided by the injection of a cryogenic liquid (nitrogen) in the form of spray into the stream of effluent entering the chamber 20.

Thus, it is proposed that refrigeration effect from three sources be available in the cooling of food articles in bulk containers or drums, said three sources chosen in any combination according to the need. They are:

(1) A cold environment, for example, as created by effluent of a cryogenic liquid (nitrogen), in the chamber 20,
(2) Indirect refrigeration from a cryogenic liquid (liquid nitrogen) as a result of prechilling granular sugar to a cryogenic temperature before it is added to the bulk container, and
(3) Supplemental refrigeration from a cryogenic liquid (nitrogen) as required by direct injection of the cryogenic liquid into the chamber.

It is pointed out that standard mechanical refrigeration may also be utilized to cool or post cool the containers, if desired.

The following table shows the supplemental refrigeration effect required to cool articles of food at various temperature levels. It will be noted that the refrigeration available from the granular sugar provides a substantial amount, if not all, of the refrigeration necessary.

TABLE III.—SUPPLEMENTAL REFRIGERATION EFFECT REQUIRED TO COOL 440 POUNDS OF STRAWBERRIES FROM 65° F. TO VARIOUS TEMPERATURE LEVELS

[In Addition to heat exchange with cooled granular sugar, 110 pounds]

| Beginning temp. (° F.) | End temp. (° F.) | Total refr. required (B.t.u.) | Refr. available from sugar | Supplement required |
|---|---|---|---|---|
| 65 | 50 | 6,065 | 5,760 | 30 |
| 65 | 45 | 8,100 | 5,680 | 2,42 |
| 65 | 40 | 10,100 | 5,610 | 4,49 |
| 65 | 35 | 12,100 | 5,520 | 6,58 |
| 65 | 30 | 14,100 | 5,440 | 8,66 |

It is clear from the foregoing that food articles such as fruits and vegetables, e.g. strawberries, may be rapidly cooled in whole or substantial part, in bulk by the extremely efficient and economical method of utilizing the sugar added to said food articles to refrigerate the food articles. The addition of sugar at cryogenic temperature results in a marked decrease in the temperature of the article of food. Furthermore, the distribution of the granular sugar at cryogenic temperature throughout the articles results in an even distribution of the refrigeration effect. The overall cooling of the granular sugar supplemented by the cooling of the effluent nitrogen and the liquid nitrogen, if needed, results in rapid cooling of food in bulk without the necessity of slow freeze tunnel cooling or freezing the food articles by immersing individual units or groups of units of the food in cryogenic liquid, and without the necessity of elaborate machinery for effecting such immersion.

It is pointed out that the addition of the granular sugar at cryogenic temperature to the food in the containers is not for the purpose of maintaining the food at a particular temperature, but for appreciable reduction of the temperature of the articles of food. For this reason, the dry granular sugar, when added, is at a cryogenic temperature, a marked difference of temperature as compared to the temperature of the food (cryogenic temperature as compared to fairly warm temperatures slightly below, at, or above freezing).

It is not intended that this invention be limited by the specific details of the method or apparatus of cooling set forth above. The steps of cooling may be rearranged without departing from the scope of the invention. For example, the sugar may be added to the containers before the containers enter onto the belts 3, 4, and 5, or while on said belts, or the sugar may be added to the containers at the time the containers are filled with articles of food. Furthermore, the method of cooling the sugar to a cryogenic temperature described is merely exemplary of one method and the invention is not limited to said method of cooling the sugar. As previously noted, although nitrogen is disclosed as an example of a cryogenic liquid or effluent, other cryogenic sources, such as liquid air, may be utilized, if desired. It is intended that the invention be limited only by what is set forth in the following claims.

We claim:

1. A process for the cooling of articles of food, comprising rapidly lowering the temperature of sugar granules to a temperature in the cryogenic range, mixing the cold granules with the articles of food to be cooled.

2. A process for the cooling of articles of food, comprising the steps splitting apart sugar granules by rapidly lowering the temperature of the sugar granules to a temperature in the cryogenic range, mixing the cold granules with the articles of food to be cooled.

3. The process of claim 2 in which the rapid lowering of the temperature results in sugar granules of approximately one third their original size.

4. A process for the cooling of articles of food comprising precooling said articles by heat exchange with effluent from a cryogenic refrigerant, rapidly lowering the temperature of sugar granules to a temperature in the cryogenic range by heat exchange with a cryogenic refrigerant and mixing the sugar with said first mentioned articles of food to be cooled.

5. The process defined in claim 4 in which the effluent used for precooling emanates from the cryogenic refrigerant which is used to cool the sugar granules.

6. A process for the cooling of articles of food in bulk, comprising the steps of cooling the articles by introducing said articles in bulk into the environment of a cryogenic effluent, reducing granular sugar to cryogenic temperature by placing it in heat exchange contact with a cryogenic media, removing said sugar from contact with said cryogenic media and intermixing the granular sugar of cryogenic temperature with the cooled articles in order to further cool the articles.

7. A process for the cooling of articles of food in bulk as set forth in claim 6, including the step of adding cryogenic liquid to said environment of effluent to further cool the articles.

8. A process for the cooling of food articles in bulk as set forth in claim 7, the cryogenic liquid and effluent being nitrogen.

9. A process for the cooling of food articles in bulk, comprising the steps of filling bulk containers with said articles, cooling said articles by introducing the containers into a cold environment, placing dry granular sugar in contact with a cryogenic media in order to reduce the temperature of said sugar to a cryogenic temperature, removing said sugar from contact with said cryogenic media and intermixing said granular sugar with the cooled articles in the containers in order to further cool the articles.

10. The process for the cooling of articles of food in bulk, as claimed in claim 9, including the step of placing said granular sugar in heat exchange relationship with both cryogenic liquid and effluent of the cryogenic liquid, before intermixture with the articles, in order to economically cool said granular sugar.

11. The process for the cooling of articles of food in bulk as claimed in claim 9, including the step of adding cryogenic liquid to said cold environment to further cool the articles.

12. A process for the cooling of articles of food in bulk as set forth in claim 9, including the step of shaking the container after introduction of the granular sugar at cryogenic temperature in order to aid intermixing of the granular sugar with the articles.

13. A process for the cooling of articles of food in bulk as claimed in claim 10, the cryogenic liquid and effluent being nitrogen.

14. A process for the cooling of articles of food in bulk, the steps of filling bulk containers with said articles, cooling said articles by introducing the containers into an environment of nitrogen effluent at cryogenic temperature, placing dry granular sugar in contact with a liquid nitrogen spray in order to reduce the temperature of said sugar to a cryogenic temperature, lowering the temperature of said sugar further by placing the cold sugar in heat exchange relationship with effluent of the liquid nitrogen spray, intermixing said sugar with the cooled articles in the containers in order to further cool the articles, shaking the container in order to aid intermixture of the granular sugar with the articles, and adding liquid nitrogen to said environment of effluent to further cool the articles.

References Cited
UNITED STATES PATENTS

| | | | |
|---|---|---|---|
| 1,729,893 | 10/1929 | Oliver | 99—193 |
| 3,035,918 | 5/1962 | Sorgenti et al. | 99—193 X |
| 3,039,276 | 6/1962 | Morrison | 99—193 X |
| 3,239,942 | 3/1966 | Mink et al. | 99—192 X |
| 3,360,384 | 12/1967 | Kurzinski et al. | 99—192 |

A. LOUIS MONACELL, *Primary Examiner.*

S. B. DAVIS, *Assistant Examiner.*

U.S. Cl. X.R.

99—192

UNITED STATES PATENT OFFICE
CERTIFICATE OF CORRECTION

Patent No. 3,453,121        Dated July 1, 1969

Inventor(s) Robert C. Webster and John S. Hinn

It is certified that error appears in the above-identified patent and that said Letters Patent are hereby corrected as shown below:

Column 4, line 35, "10,000" should read -- 10,100 --; line 51 "It" should read -- If --.
Column 5, in Table III, last column (Supplement required), "3( should read -- 305 --; "2,42" should read -- 2,420 --; "4,49" should read -- 4,490 --; "6,58" should read -- 6,580 --; "8,6( should read -- 8,660 --.

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents